United States Patent
Inchingolo et al.

(10) Patent No.: US 7,467,383 B2
(45) Date of Patent: Dec. 16, 2008

(54) SYSTEM FOR CONTROLLING TASK EXECUTION USING A GRAPHICAL REPRESENTATION OF TASK DEPENDENCY

(75) Inventors: Frank Inchingolo, Edwardville, IL (US); Craig W. Stanfill, Lincoln, MA (US)

(73) Assignee: Ab Initio Software LLC, Lexington, MA (US)

( * ) Notice: Subject to any disclaimer, the term of this patent is extended or adjusted under 35 U.S.C. 154(b) by 620 days.

(21) Appl. No.: 10/796,612

(22) Filed: Mar. 8, 2004

(65) Prior Publication Data

US 2005/0210473 A1 Sep. 22, 2005

(51) Int. Cl.
*G06F 9/46* (2006.01)

(52) U.S. Cl. ...................... 718/104; 718/102

(58) Field of Classification Search ................. 718/104, 718/102
See application file for complete search history.

(56) References Cited

U.S. PATENT DOCUMENTS

| | | | |
|---|---|---|---|
| 5,202,987 A | 4/1993 | Bayer et al. | |
| 5,522,022 A | 5/1996 | Rao et al. | |
| 5,590,335 A | 12/1996 | Dubourreau et al. | |
| 5,872,981 A | 2/1999 | Waddington et al. | |
| 7,039,915 B2 * | 5/2006 | Kavoori et al. | 718/104 |

OTHER PUBLICATIONS

Romberg, M., "UNICORE: Beyond Web-based Job-Submission", Proceedings of the 42nd Cray User Group Conference, Noordwijk (May 22-26, 2000).

"Unicenter AutoSys Job Management", Computer Associates, Copyright 2001.

* cited by examiner

*Primary Examiner*—Meng-Ai An
*Assistant Examiner*—Eric C Wai
(74) *Attorney, Agent, or Firm*—Fish & Richardson P.C.

(57) ABSTRACT

A specification of a graphical representation of task dependency has a plurality of task elements each associated with a different task, a resource element having a plurality of attachment locations, and linking elements coupling the task elements to the resource element at the plurality of associated attachment locations. Associations of task elements to attachment locations on the resource element specify an ordering constraint on the tasks associated with the task elements. The tasks are executed according to the graphical representation of task dependency.

28 Claims, 3 Drawing Sheets

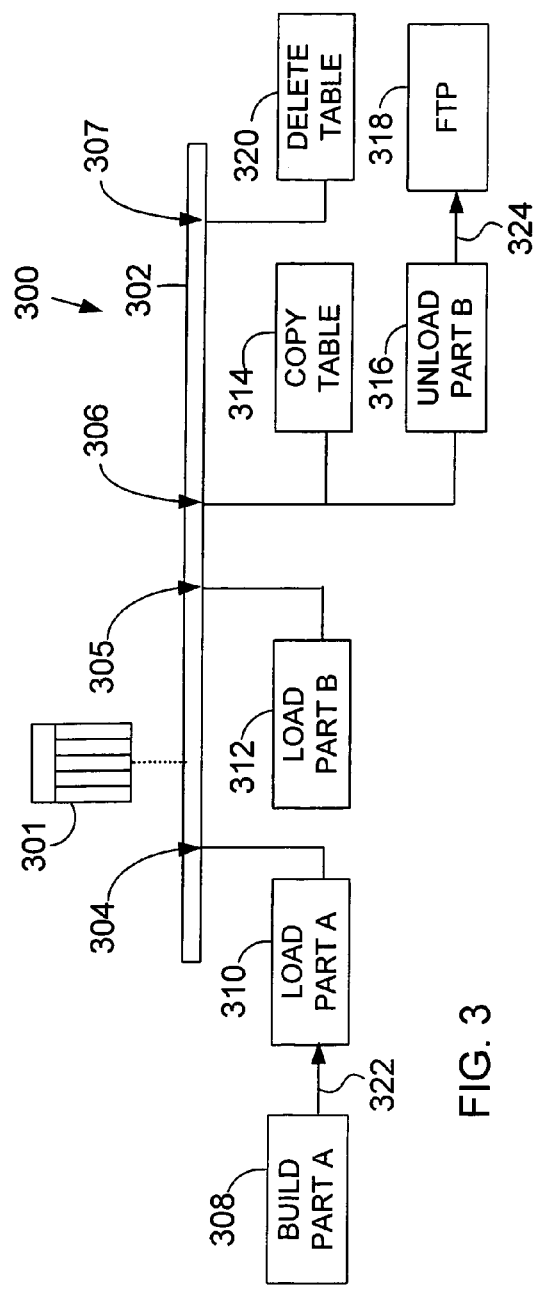
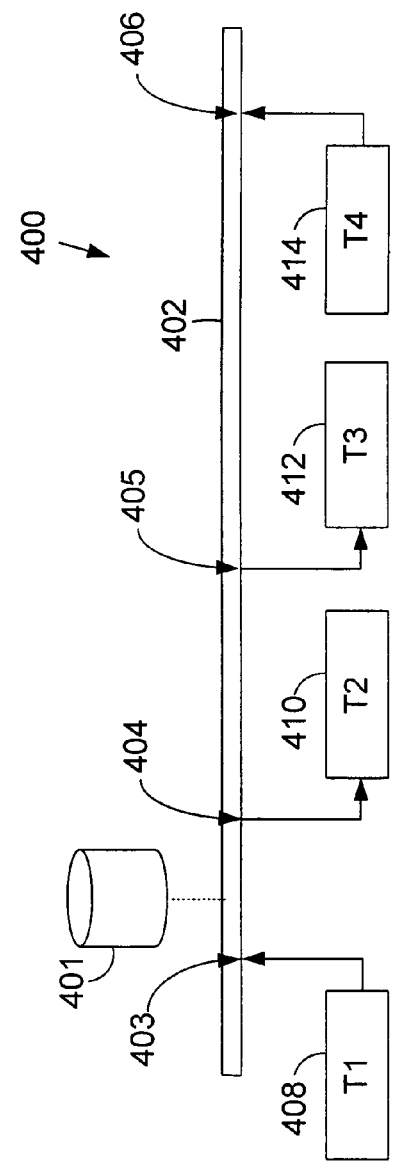
FIG. 3
FIG. 4

SYSTEM FOR CONTROLLING TASK EXECUTION USING A GRAPHICAL REPRESENTATION OF TASK DEPENDENCY

BACKGROUND

This invention relates to controlling task execution.

Computational tasks within computational systems often have dependencies that lead to constraints that some tasks start or finish execution before or after other tasks. A partial ordering of the tasks may be imposed to satisfy such constraints. The tasks may be performed by processes running within the same or different runtime environments with some tasks potentially running concurrently. A control process can be implemented to initiate and monitor execution of the tasks, according to a specification of the task dependency constraints.

FIG. 1A shows an example of a graph representing dependencies among tasks, a "dependency graph." The nodes represent the tasks and the directed links represent dependency constraints. In this example the dependencies among the tasks come from access to a common data structure, in this case a table. An initialize table task 102 sets the size of the table and enters default values within the table. A load table task 104 writes a set of data records into rows of the table. A first link 106 specifies that the initialize table task 102 must execute before the load table task 104. An unload table task 108 reads the data records from the rows of the table to be used in subsequent computation. A second link 110 specifies that the load table task 104 must execute before the unload table task 108. The directionality of a link indicates the order of execution. There is also an implied dependency in that the initialize table task 102 must execute before the unload table task 108.

If tasks to be performed in a computational system are changed (e.g., by adding or deleting tasks) the corresponding dependency graph may need to be changed. Referring to FIG. 1B, the dependency graph 100 is modified, in graph 112, to include a sort table task 114 between the load table task 104 and the unload table task 108. The link 110 between the load table task 104 and the unload table task 108 is replaced by a link 116 between the load table task 104 and the sort table task 114, and a link 118 between the sort table task 114 and the unload table task 108.

Dependency graphs can specify constraints that allow tasks to be performed concurrently. Any one of a group of tasks may be able to execute after a preceding task. More generally, rules can be formulated to determine a partial ordering among tasks with dependencies represented by an acyclic directed graph. An example of a rule for a partial ordering among tasks in a dependency graph is (rule 1): if a directed path through the graph exists from a "predecessor task" to a "successor task" then the successor task must not begin execution until after the predecessor task finishes execution.

FIG. 1C shows a dependency graph 120 where a first group 122 of three tasks that load different parts of a table must all finish execution before any of a second group 124 of three tasks that perform operations (e.g., read, sort, etc.) on parts of the table begins execution. This example illustrates the potential complexity that can exist in some dependency graphs. In a graph with this type of structure the number of links between the groups (9 in this example) increases as the product of the number of tasks in the first group (3 in this example) times the number of tasks in the second group (3 in this example). There are also links to each of the tasks in the first group 122 from an initialize table task 126, and from each of the tasks in the second group 124 to an unload table task 128.

SUMMARY

In a general aspect, the invention features a method for control of task execution in a computer system. A specification of a graphical representation of task dependency has a plurality of task elements each associated with a different task, a resource element having a plurality of attachment locations, and linking elements coupling the task elements to the resource element at the plurality of associated attachment locations. Associations of task elements to attachment locations on the resource element specify an ordering constraint on the tasks associated with the task elements. The tasks are executed according to the graphical representation of task dependency.

This aspect can include one or more of the following features:

In the graphical representation, the task elements include nodes and the linking elements include links.

The resource element includes a timeline with the attachment locations being associated with points on the timeline.

The resource element is associated with a computation resource for access by the tasks. The computation resource can include a storage resource such as a data table.

Aspects of the invention can include one or more of the following advantages:

Use of a resource element in a graphical representation of task dependency enables explicit visualization of interactions with a resource that are associated with ordering constraints. This enables a user to graphically specify such ordering constraints at configuration time or monitor task execution and interaction at runtime.

Use of a resource element in a graphical representation of task dependency can reduce a potentially large number of links associated with a large number of tasks interacting with the same resource.

A timeline associated with a resource can provide a compact visual representation of an ordering constraint due to a series of interactions with that resource.

Other features and advantages of the invention are apparent from the following description, and from the claims.

DESCRIPTION OF DRAWINGS

FIG. 3 is a dependency graph with a timeline resource element and inter-task dependency links.

FIG. 4 is a dependency graph with a timeline resource element having directed links.

DESCRIPTION

One way to satisfy dependency constraints among tasks executed or initiated in a runtime environment is by implementing a control process that accepts a graphical representation of the dependencies as a specification of those dependencies. The control process initiates execution of the tasks (within the same or a different runtime environment) according to the graphical representation of task dependency. For example, a user can construct a dependency graph by associating nodes and links of a graph with tasks and dependencies, respectively, using a graphical user interface. Alternatively, a dependency graph can be generated automatically based on explicit or implicit ordering constraints. Once a dependency graph is generated, a user can view the graph through the graphical user interface.

A first approach to representing constraints in a dependency graph that is associated with a group of tasks interacting with a resource is to include a resource element in the dependency graph to more efficiently specify the partial ordering of tasks. The resource element is not necessarily associated with a processing task. The resource element is used to specify the ordering constraint (between a pair of tasks, or among a group of tasks) and to identify the resource related to that constraint.

Figure 1A:
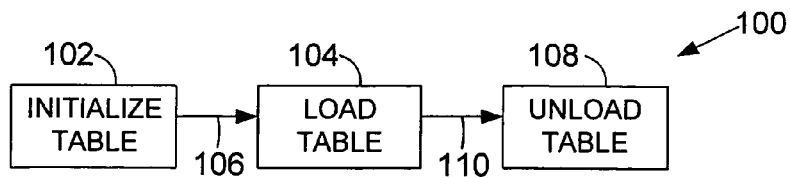
FIG. 1A is a sequential dependency graph.
Figure 1B:
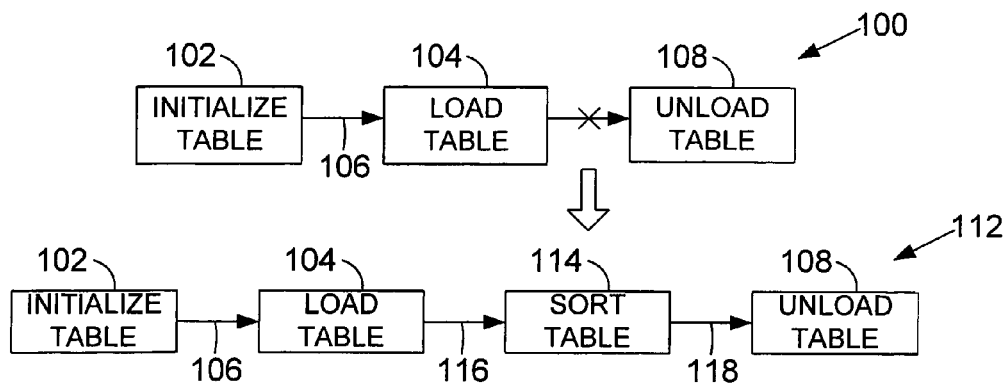
FIG. 1B illustrates a modification of the dependency graph of FIG. 1A.
Figure 1C:
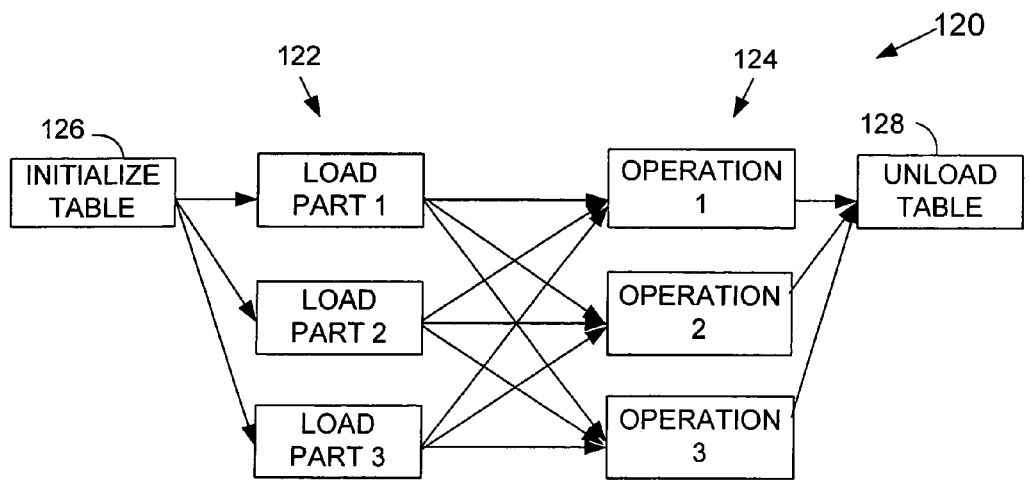
FIG. 1C is a non-sequential dependency graph.
Figure 2A:
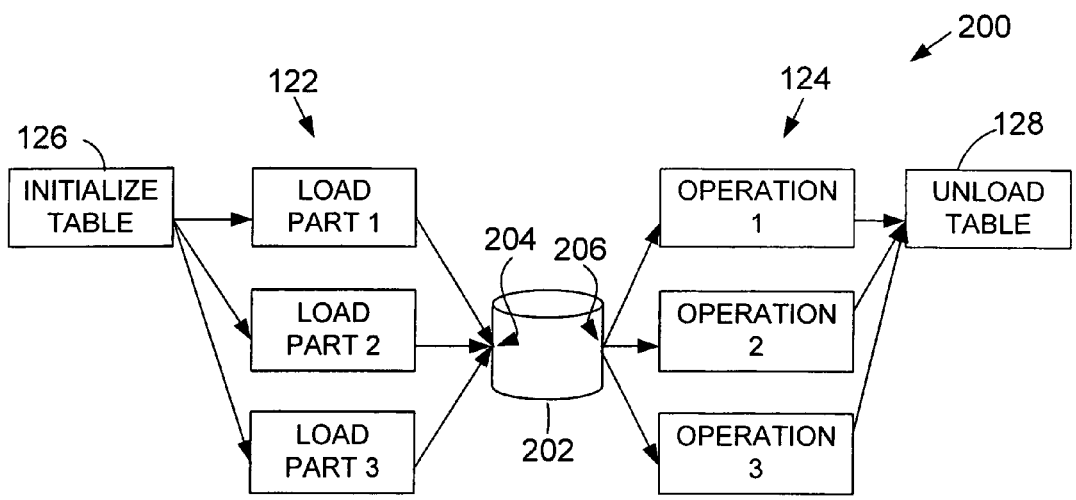
FIG. 2A is a dependency graph with a resource element.

For example, the dependency graph 120 shown in FIG. 1C can be modified to include a resource element representing the table which is accessed by the tasks. Referring to FIG. 2A, a dependency graph 200 includes a table resource element 202 that is represented as another node in the graph along with the task nodes. The first group 122 of three tasks are now linked to an "input" attachment location 204 of the table resource element 202, and the second group 124 of three tasks are linked to an "output" attachment location 206 of the table resource element 202. In a graph with this type of structure the number of links between the groups (6 in this example) increases in proportion to the number of tasks in each of the two groups (3 in this example). This represents a large potential reduction in complexity in terms of the number of links.

The same rule for the partial ordering among tasks can be used for the type of dependency graph shown in FIG. 2A as for dependency graphs with only task nodes (rule 1): if a directed path through the graph exists from a "predecessor task" to a "successor task" then the successor task must not begin execution until after the predecessor task finishes execution. A node associated with a resource can be added to a graph for any pair of individual tasks or groups of tasks that have a predecessor/successor relationship due to interactions with that resource.

A second approach to representing constraints is to provide a representation of constraints on a series of interactions with a resource. As in the previous approach, a graphical element representing a resource is introduced into the graph. This graphical element includes a timeline that is used to specify an ordering constraint for multiple interactions with the resource. A "timeline resource element" enables a visual indication of the order of execution of a group of tasks, which interact with a resource. Tasks are linked to a timeline resource element in an order corresponding to the order of execution of the tasks.

Figure 2B:
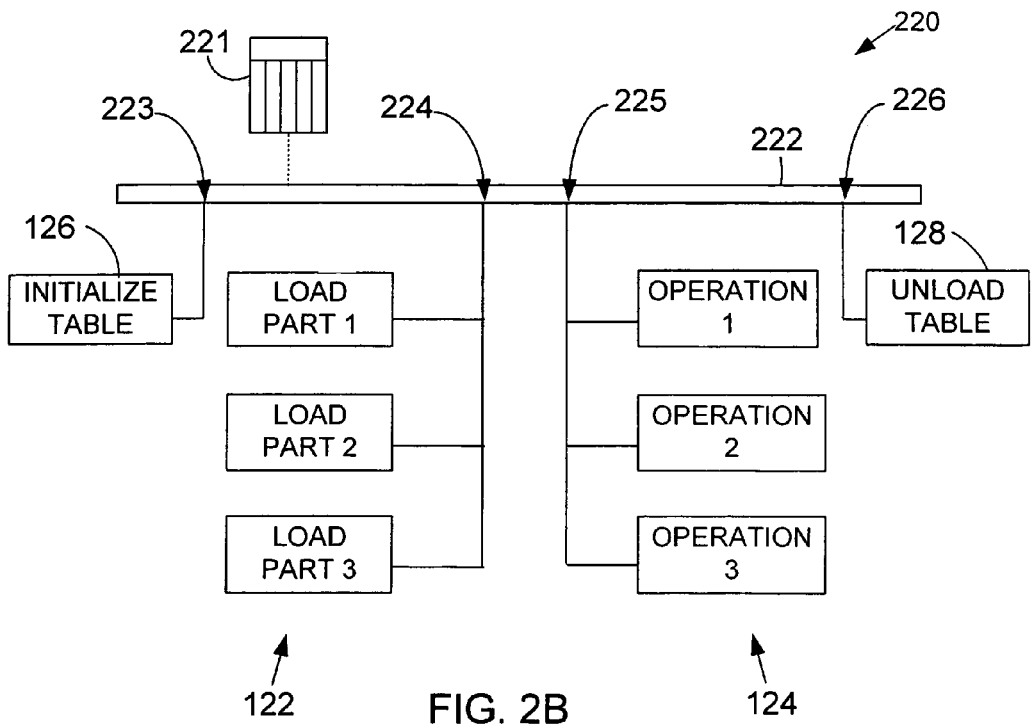
FIG. 2B is a dependency graph with a timeline resource element.

Referring to FIG. 2B, a dependency graph 220 includes a timeline resource element 222. Tasks are linked to attachment locations 223-226 on the timeline resource element 222, and the relative positions of the attachment locations on the timeline resource element 222 define an ordering constraint for the tasks linked to the timeline resource element 222. (The distance between any two of the attachment locations 223-226 is not necessarily related to actual time between executions of the corresponding tasks.) Tasks interacting with the resource that are permitted to execute concurrently are linked to same attachment location on a timeline. Tasks are executed in time sequence (from left to right in this example) according to their attachment locations on the timeline. In this graph 220, the relative position of the attachment location 224 for the first group 122 of tasks and the attachment location 225 for the second group of tasks specifies the same ordering constraint for the groups of tasks as specified in graphs 120 and 200. There is also a single link to the timeline resource element 222 at an attachment location 223 from the initialize table task 126, and a single link from the timeline resource element 222 at an attachment location 226 to the unload table task 128, which specify the same ordering constraint for these tasks as specified in graphs 120 and 200.

The resource identified by the timeline resource element can be graphically represented according to the type of the resource, as in this example, as a table 221. A resource identified by a timeline resource element can be any of a variety of types of resources (e.g., a database table, a serial or parallel file, a storage device, a queue, etc.) The resource content can exist prior to execution of the first task that is linked to the timeline resource element, or the resource can be completely or partially generated by actions performed by the first task linked to the timeline resource element. For example, the first task linked to the resource element can execute a command that generates a table or file which is the resource content identified by the graphical resource element. There may be a final task attached to the timeline resource element that deletes the table or file.

A new rule for the partial ordering among tasks in this dependency graph 220 is (rule 2): tasks attached to the timeline resource element 222 must not begin execution until after all tasks attached to the timeline resource element 222 at prior (i.e., to the left in this example) attachment locations finish execution. This new rule (rule 2) can be combined with the previous rule (rule 1) to implement a new type of dependency graph specifying a partial ordering among tasks.

Referring to FIG. 3, a dependency graph 300 includes a timeline resource element 302 with attachment locations 304-307. Links to the timeline resource element specify an ordering constraint for interactions with a table 301. Graph 300 also contains "inter-task" links 322 and 324 that specify further ordering constraints for interactions between tasks that do not involve direct interaction with the table 301. A build part A task 308 generates data to be loaded into the table 301. Then a load part A task 310 loads the generated data into the table 301. Since a load part B task 312 executes after the load part A task 310 (according to rule 2), and the load part A task executes after the build part A task (according to rule 1), it is also true that the load part B task 312 executes after the build part A task 308.

The dependency graph 300 also specifies some tasks that can occur concurrently (or in an unspecified order). After the load part B task 312 finishes execution, two tasks (e.g., running on a different processor than the load part B task) can access the table 301 in any order. A copy table task 314 copies all of the data in the table 301 to a location, and an unload part B task 316 unloads data from the table 301 to a temporary location for access by an ftp task 318. The ftp task 318 has an ordering constraint to execute (e.g., transmit the data from the temporary location) after the unload part B task 316 (due to rule 1), however, the ftp task 318 may execute before, after, or concurrently with the copy table task 314. Also, while rule 2 constrains a delete table task 320 to execute after both the copy table task 314 and the unload part B task 316 finish execution, the delete table task 320 may execute before, after, or concurrently with the ftp task 318. The examples of task ordering specified by graph 300, illustrate how the two rules (rule 1 and rule 2) can be applied in combination to specify ordering among tasks in a graph. Other ordering rules can also be formulated to combine a timeline resource element with other graphical representations of task dependency to yield consistent ordering constraints.

The links to a timeline resource element do not need to be directed, however, directionality can be used to indicate features or aspects of the task interactions and/or relationships, such as produce or consume relationships between a task and a resource. For example, FIG. 4 shows a dependency graph 400 having directed links attached to a timeline resource element 402 (e.g., identifying a file 401) at attachment locations 403-406. A first task 408 is linked to the timeline resource element 402 with a directed link indicating a produce relationship (e.g., the task 408 writes data to the file 401). A second task 410 and a third task 412 are linked to the timeline resource element 402 with directed links indicating consume relationships (e.g., the tasks 410 and 412 read data from the file 401). A fourth task 414 is then linked with a produce relationship.

In some cases, the directionality of the links can provide information that allows re-ordering of the tasks without changing task dependencies. In one such case, if a produce relationship is a relationship in which a task may change the state of the resource and a consume relationship is a relationship in which a task does not change the state of the resource, then adjacent consume tasks may be reordered. For example, in dependency graph 400 the positions of the second task 410 and the third task 412 (both consume tasks) can be exchanged without affecting any results of actions of the first task 408 (or any previous tasks) or the fourth task 414 (or any later tasks).

The approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graphs described herein can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A method for control of task execution in a computer system including:

accepting a specification of a graphical representation of task dependency having
    a plurality of task elements each associated with a different task,
    a resource element having a plurality of attachment locations, wherein the resource element comprises a timeline with attachment locations being associated with points on the timeline, and
    linking elements coupling the task elements to the resource element at the plurality of attachment locations, wherein couplings of task elements to attachment locations on the resource element specify an execution ordering constraint on the tasks associated with the task elements to define an order in which the tasks are to be executed; and
executing the tasks according to the graphical representation of task dependency.

2. The method of claim 1 wherein the task elements comprise nodes in the graphical representation, and the linking elements comprise links in the graphical representation.

3. The method of claim 1 wherein the resource element is associated with a computation resource for access by the tasks.

4. The method of claim 3 wherein the computation resource includes a storage resource.

5. The method of claim 3 wherein the computation resource includes a data table.

6. A data structure tangibly embodied on a computer readable storage medium, the data structure including:
    data representations of a plurality of task elements,
    a data representation of a resource element having a plurality of attachment locations, wherein the resource element comprises a timeline with the attachment locations being associated with point on the timeline, and
    data associating the task elements to the attachment locations, wherein associations of task elements to attachment locations specify an execution ordering constraint on tasks associated with the task elements to define an order in which the tasks are to be executed;
    wherein the data structure specifies a graphical representation of task dependency used by a computer system to execute the tasks associated with the task elements according to the ordering constraint.

7. The data structure of claim 6 wherein the data structure is associated with a resource.

8. The data structure of claim 6 wherein the resource is associated with a computation resource for access by the tasks.

9. The data structure of claim 8 wherein the computation resource includes a storage resource.

10. The data structure of claim 8 wherein the computation resource includes a data table.

11. A task execution system including:
    a repository including data conforming to a data model, the data model including
        a plurality of task elements each associated with a different task,
        a resource element having a plurality of attachment locations, wherein the resource element comprises a timeline with the attachment locations being associated with points on the timeline, and
        linking elements coupling the task elements to the resource element at the plurality of attachment locations, wherein couplings of task elements to attachment locations on the resource element specify an execution ordering constraint on the tasks associated with the task elements to define an order in which the tasks are to be executed, and a task execution module including at least one processor, having access to the repository over at least one input device or port in communication with the repository, configured to execute the tasks according to the graphical representation of task dependency.

12. The system of claim 11 wherein the task elements comprise nodes in the graphical representation, and the linking elements comprise links in the graphical representation.

13. The system of claim 11 wherein the resource element is associated with a computation resource for access by the tasks.

14. The system of claim 13 wherein the computation resource includes a storage resource.

15. The system of claim 13 wherein the computation resource includes a data table.

16. A task execution system including at least one processor including:

means for accepting a specification of a graphical representation of task dependency having a plurality of task elements each associated with a different task, a resource element having a plurality of attachment locations, wherein the resource element comprises a timeline with the attachment locations being associated with points on the timeline, and linking elements coupling the task elements to the resource element at the plurality of attachment locations, wherein couplings of task elements to attachment locations on the resource element specify an execution ordering constraint on the tasks associated with the task elements to define an order in which the tasks are to be executed, and means for executing the tasks according to the graphical representation of task dependency.

17. The system of claim 16 wherein the task elements comprise nodes in the graphical representation, and the linking elements comprise links in the graphical representation.

18. The system of claim 16 wherein the resource element is associated with a computation resource for access by the tasks.

19. The system of claim 18 wherein the computation resource includes a storage resource.

20. The system of claim 18 wherein the computation resource includes a data table.

21. A method for control of task execution in a computer system including:

accepting a specification of a graphical representation of task dependency having a plurality of task elements each associated with a different task, a resource element having a plurality of attachment locations, wherein the resource element comprises a timeline with the attachment locations being associated with points on the timeline, and linking elements coupling the task elements to the resource element at a plurality of attachment locations, in a time-ordered sequence defining an execution ordering constraint on the tasks associated with the task elements to define an order in which the tasks are to be executed, and executing the tasks according to the graphical representation of task dependency.

22. The method of claim 1 wherein relative positions of the plurality of attachment locations on the resource element define the ordering constraint.

23. The method of claim 22 wherein the plurality of attachment locations comprise at least three attachment locations.

24. The data structure of claim 6 wherein relative positions of the plurality of attachment locations on the resource element define the ordering constraint.

25. The data structure of claim 24 wherein the plurality of attachment locations comprise at least three attachment locations.

26. The system of claim 11 wherein relative positions of the plurality of attachment locations on the resource element define the ordering constraint.

27. The system of claim 26 wherein the plurality of attachment locations comprise at least three attachment locations.

28. The system of claim 16 wherein relative positions of the plurality of attachment locations on the resource element define the ordering constraint.

* * * * *

UNITED STATES PATENT AND TRADEMARK OFFICE
CERTIFICATE OF CORRECTION

PATENT NO. : 7,467,383 B2
APPLICATION NO. : 10/796612
DATED : December 16, 2008
INVENTOR(S) : Frank Inchingolo and Craig W. Stanfill It is certified that error appears in the above-identified patent and that said Letters Patent is hereby corrected as shown below:

Column 6, Line 55-56: In Claim 11, delete "the data model including" and insert -- the data model specifying a graphical representation of task dependency, including --, therefore.

Signed and Sealed this

Fourteenth Day of April, 2009

JOHN DOLL
*Acting Director of the United States Patent and Trademark Office*